US012399462B2

(12) United States Patent
Monferrer et al.

(10) Patent No.: US 12,399,462 B2
(45) Date of Patent: Aug. 26, 2025

(54) REMOTE CONTROL DEVICE FOR A HOROLOGICAL MOVEMENT OF A WATCH AND WATCH COMPRISING SAID CONTROL DEVICE

(71) Applicant: Harry Winston SA, Plan-les-Ouates (CH)

(72) Inventors: Bernat Monferrer, St-Prex (CH); Steven Denoreaz, Bellefontaine (FR)

(73) Assignee: Harry Winston SA, Plan-les-Ouates (CH)

( * ) Notice: Subject to any disclaimer, the term of this patent is extended or adjusted under 35 U.S.C. 154(b) by 298 days.

(21) Appl. No.: 18/177,282

(22) Filed: Mar. 2, 2023

(65) Prior Publication Data

US 2023/0315016 A1 Oct. 5, 2023

(30) Foreign Application Priority Data

Mar. 30, 2022 (EP) .................................... 22165358

(51) Int. Cl.
*G04B 3/04* (2006.01)

(52) U.S. Cl.
CPC .................................... *G04B 3/046* (2013.01)

(58) Field of Classification Search
CPC .... G04B 3/046; G04B 37/066; G04B 27/001; G04B 27/00; G04B 3/12; G04B 27/08; G04B 3/048; G04B 37/064; G04B 27/06; G04C 13/00
See application file for complete search history.

(56) References Cited

U.S. PATENT DOCUMENTS 4,555,185 A * 11/1985 Vuilleumier ........... G04B 27/00 368/185
2007/0025191 A1* 2/2007 Pittet ...................... G04B 27/04 368/319

(Continued)

FOREIGN PATENT DOCUMENTS

CH 689 570 A5 6/1999
EP 1 710 635 A1 10/2006

(Continued)

OTHER PUBLICATIONS

European Search Report issued Aug. 16, 2022 in European Application 22165358.7 filed on Mar. 30, 2022, 3 pages (with English Translation of Categories of cited documents).

(Continued)

*Primary Examiner* — Edwin A. Leon
(74) *Attorney, Agent, or Firm* — Oblon, McClelland, Maier & Neustadt, L.L.P.

(57) ABSTRACT

A remote control device for a horological movement of a watch wherein the remote control device includes an input control member intended to be acted on by a user and kinematically connected, with a connecting member, to an output control member intended to act on the horological movement of the watch, the connecting member being intended to be arranged such that it can rotate about the horological movement, and being configured such that it is driven in rotation by the input control member when the latter is acted upon, and such that it causes the output control member to move during this rotation.

13 Claims, 2 Drawing Sheets

(56) References Cited

U.S. PATENT DOCUMENTS

| | | | | |
|---|---|---|---|---|
| 2011/0216631 | A1* | 9/2011 | Pittet .................... | G04B 37/066 368/190 |
| 2018/0095425 | A1 | 4/2018 | Vuille | |
| 2018/0314211 | A1 | 11/2018 | Hurni | |

FOREIGN PATENT DOCUMENTS

| | | | |
|---|---|---|---|
| EP | 3 306 421 | A1 | 4/2018 |
| EP | 3 396 469 | A1 | 10/2018 |
| JP | 2018-189629 | A | 11/2018 |

OTHER PUBLICATIONS

Japanese Office Action issued Apr. 2, 2024 in Japanese Patent Application No. 2023-036216 (with English Translation), 10 pages.

* cited by examiner

REMOTE CONTROL DEVICE FOR A HOROLOGICAL MOVEMENT OF A WATCH AND WATCH COMPRISING SAID CONTROL DEVICE

CROSS-REFERENCE TO RELATED APPLICATION

This application claims priority to European Patent Application No. 22165358.7 filed on Mar. 30, 2022, the entire disclosure of which is hereby incorporated herein by reference.

TECHNICAL FIELD OF THE INVENTION

The invention relates to the horological field, and concerns in particular a remote control device for a horological movement of a watch and a watch comprising said control device.

TECHNOLOGICAL BACKGROUND

A control member, such as a push-piece, a corrector, or a crown, etc., is arranged in a middle of a watch, typically facing a horological movement mechanism which it is intended to actuate once acted on by a user.

By way of example, the control members for a chronograph, striking mechanism, time zone change, or date correction, etc., are frequently arranged in the immediate vicinity of the mechanisms of the horological movement that they are intended to actuate.

Thus, the architecture of the horological movements is often determined by the layout of the one or more control members in the middle, or vice-versa.

However, in some cases, the arrangement of the control members remotely from the mechanisms they are intended to actuate can be sought. For example, in order to reduce the development and production costs of a watch, it can be of particular interest to design a watch with a horological movement that has already been produced and with a middle that has also already been produced.

One of the solutions developed to meet this need is described in the Swiss patent document No. 689570. This solution takes the form of a control device including a set of levers for arranging the control member remotely from the mechanism to be actuated.

However, this solution has the drawback of significantly increasing the dimensions of the watch case in which it is applied. Moreover, it only allows the control member to be offset from the mechanism it is intended to actuate within limits.

Another drawback of the existing solutions is that the design thereof must be significantly adapted for each scenario, in particular as a function of the dimensions and geometry of the middle, and as a function of the distance between the control member and the mechanism it is intended to actuate.

SUMMARY OF THE INVENTION

The invention overcomes the aforementioned drawbacks by providing a remote control device for a horological movement allowing a control member to actuate a mechanism of the horological movement without their position relative to one another being a constraint.

More specifically, the present invention allows a control member to be kinematically connected with a mechanism of a horological movement to be actuated, regardless of the respective positions thereof, relative to one another, and regardless of the dimensions and geometry of the middle.

To this end, the present invention relates to a remote control device for a horological movement of a watch including an input control member intended to be acted on by a user and kinematically connected, by means of a connecting member, to an output control member intended to act on the horological movement of said watch. The connecting member is intended to be arranged such that it can rotate about the horological movement and being configured such that it can be driven in rotation by the input control member when the latter is acted upon, and to cause the output control member to move during this rotation.

In specific embodiments, the invention can further include one or more of the following features, which must be considered singly or according to any combination technically possible.

In specific embodiments, the control device includes a support structure with which the input and output control members are integral, said support structure forming an annular recess receiving the connecting member.

In specific embodiments, the connecting member forms a ring.

In specific embodiments, the input control member includes an engagement profile configured to engage with a driven engagement element of the connecting member, so as to drive said connecting member such that it rotates when said input control member is acted upon.

In specific embodiments, the engagement profile and the driven engagement element are respectively shaped as complementary bevels.

In specific embodiments, the input control member is formed by a lever extending between a first end by which it is attached to the support structure such that it can rotate, at a first end, said lever including, at a second end, the engagement profile.

In specific embodiments, the input control member is arranged such that it can slide relative to the support structure and is configured to engage, via the engagement profile, with a transmission element attached to the support structure such that it can rotate and engaging with the connecting member, such that the sliding of said input control member causes the connecting member to rotate.

In specific embodiments, the output control member includes an engagement profile configured to engage with a driving engagement element of the connecting member, such that the rotation of said connecting member causes said output control member to move.

In specific embodiments, the output control member is formed by a lever attached to the support structure such that it can rotate, at a first end, said lever including a bevel at a second end, constituting the engagement profile, said output control member being intended to act on the horological movement via an internal flank opposite the engagement profile.

In specific embodiments, the output control member is connected by a pivot link, on the one hand to the connecting member, and on the other hand to the support structure, said output control member including a bearing arm intended to be arranged such that it bears against a balance of the horological movement in order to perform a balance stop function when the input control member is acted upon.

In specific embodiments, the driving engagement element is constituted by a catch.

In specific embodiments, the control device comprises a spring connected to the connecting member and biased to move it into a rest position in which said connecting member is capable of engaging with the input control member.

In specific embodiments, the control device includes a second input control member and a second output control member kinematically connected to one another via the connecting member and respectively configured to engage with a driven engagement member and with a driving engagement member, the input control members being configured such that, depending on which one is acted upon, the connecting member is driven in a different direction of rotation and causes one or the other output control member respectively to move.

In specific embodiments, the connecting member comprises a locking element arranged to constitute a banking preventing one of the input control members from making any movement when the other is acted upon.

In specific embodiments, the locking element is formed by a tooth extending between two bevelled radial flanks each constituting a driven engagement element, the tooth further comprising an outer flank connecting the radial flanks together and being arranged so as to constitute a banking preventing one of the input control members from making any movement, when the other is acted upon.

According to another aspect, the present invention relates to a watch comprising a horological movement and a control device as described hereinabove.

BRIEF DESCRIPTION OF THE FIGURES

Other features and advantages of the invention will become apparent upon reading the following detailed description given by way of a non-limiting example, and with reference to the accompanying drawings, in which.

DETAILED DESCRIPTION OF THE INVENTION

Figure 1:
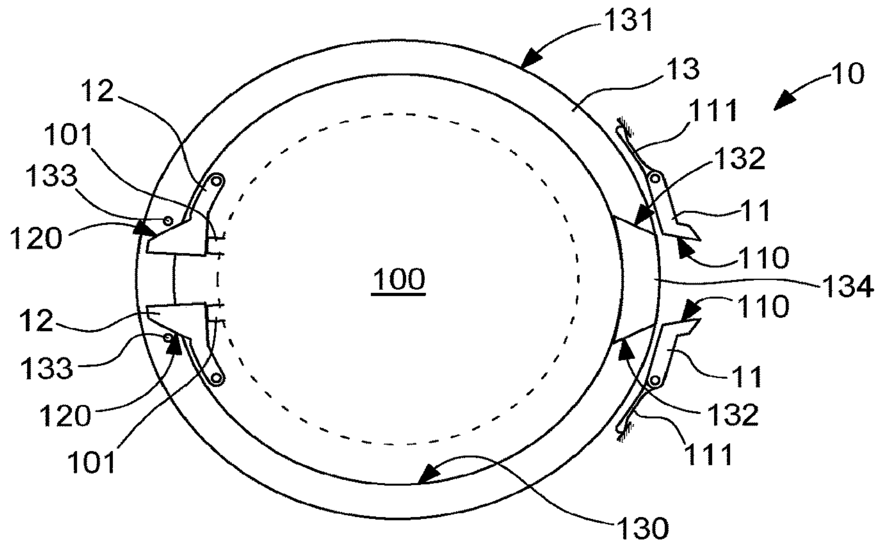
FIG. 1 diagrammatically shows a front view of a remote control device for a horological movement of a watch according to a preferred example embodiment of the invention.

The present invention relates to a remote control device 10 for a horological movement 100 of a watch, as shown in FIGS. 1 to 5. It should be noted that the horological movement 100 is shown as a dashed line in the figures, and that only part of the watch is shown.

The control device 10 includes at least one input control member 11 to be acted on by a user.

As shown in FIGS. 1 to 5, the input control member 11 is kinematically connected, via a connecting member 13, to an output control member 12 intended to act on the horological movement 100 of said watch.

Figure 2:
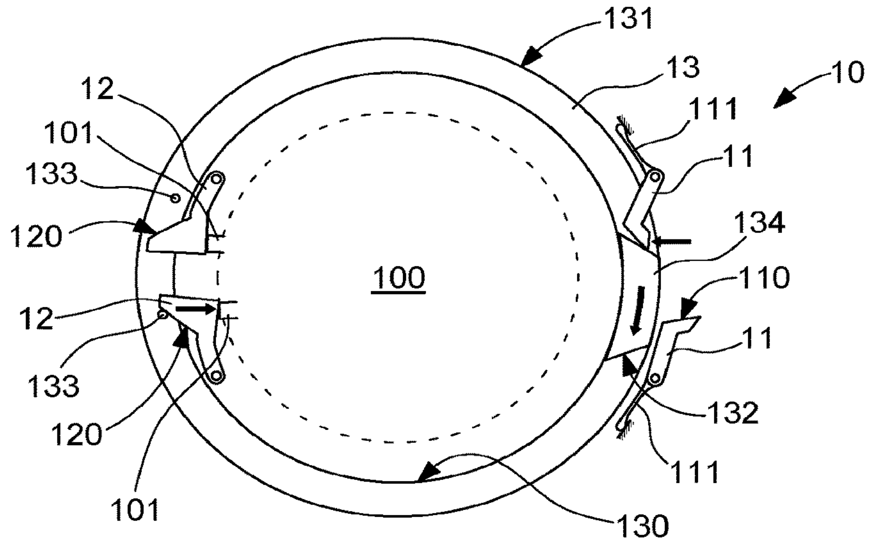
FIGS. 2 and 3 respectively diagrammatically show the control device of FIG. 1 in which an input control member is acted upon.
Figure 3:
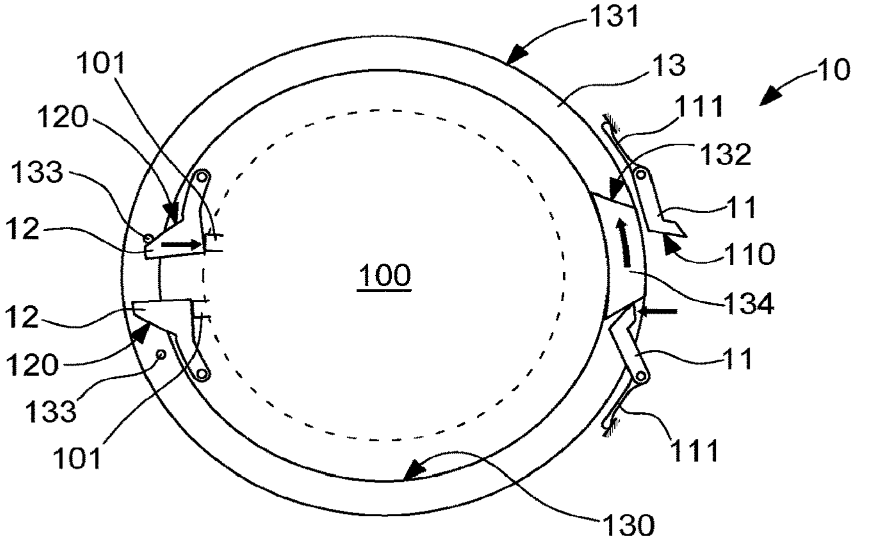

In the example embodiment shown in FIGS. 1 to 3, the control device 10 includes two input control members 11 and two output control members 12, each of said input control members 11 being kinematically connected to an output control member 12.

Figure 4:
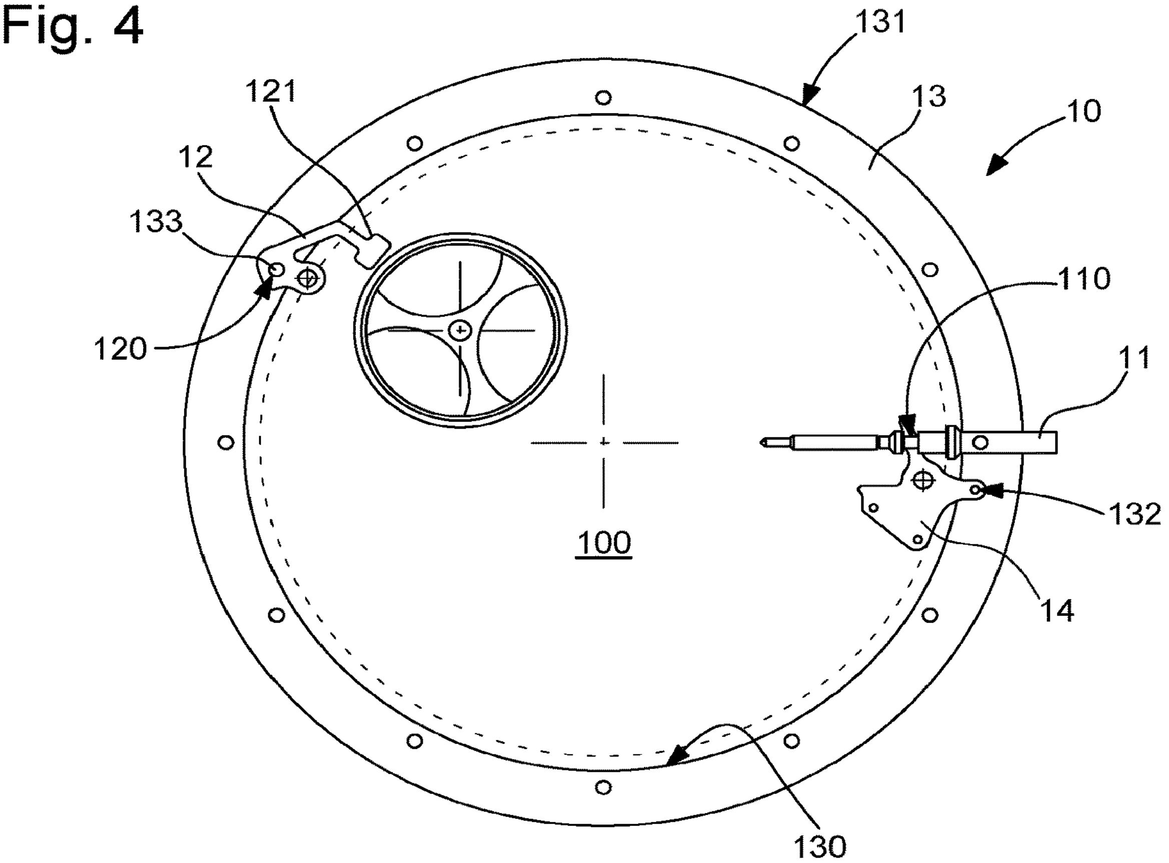
FIG. 4 shows another example embodiment of the control device according to the invention.
Figure 5:
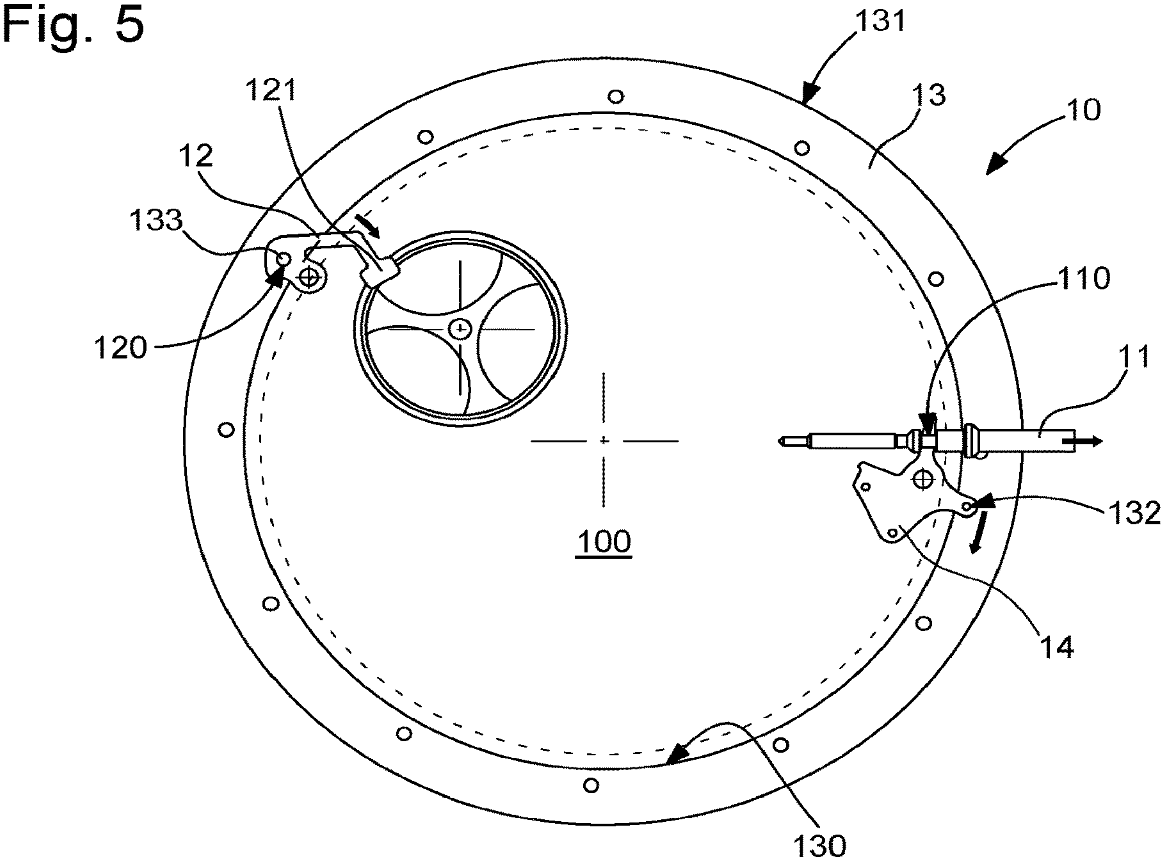
FIG. 5 shows the control device of FIG. 4 in which the control member is acted upon.

Alternatively, in the example embodiment shown in FIGS. 4 and 5, the control device 10 includes a single input control member 11 and a single output control member 12.

For ease of reading, the invention is described hereinbelow in general terms, with a single input control member 11 and a single output control member 12.

As shown in FIGS. 1 to 3, the output control member 12 can be intended to engage with a horological component of the horological movement 100 via an actuator 101 of the horological movement 100, such as a corrector, a push-piece, a lever, a yoke, or a wheel, etc., of the movement for performing a function of said horological movement 100.

In the example embodiment of the invention shown in FIGS. 4 and 5, the output control member 12 is intended to engage directly with a horological component of the horological movement 100, such as a balance 102. Such a function is thus a balance stop function, also referred to as a "stop-seconds" or "stop-balance".

In alternative embodiments of the invention, such a function can be a function of a chronograph, a date correction, a moon phase correction, or a tourbillon carriage or karussel stop function, etc.

The output control member 12 is thus intended to be sandwiched between the horological movement 100 and the connecting member 13, as shown in FIGS. 1 to 5.

The connecting member 13 is intended to be arranged such that it can rotate about the horological movement 100 in a support structure, for example in a middle of a watch case (not visible in the figures). More specifically, the support structure forms an annular recess, such as a groove, intended to receive the connecting member 13.

The connecting member 13 preferably forms a closed ring. However, in other alternative embodiments of the invention, the connecting member 13 can form an open ring extending over an angular sector that depends on the angular distance between the input control member 11 and the output control member 12.

Advantageously, the connecting member 13 is configured so as to be driven in rotation by the input control member 11 when the latter is acted upon, and to cause the output control member 12 to move during this rotation.

The connecting member 13 is defined between an inner peripheral wall 130 and an outer peripheral wall 131, the output control member 12 being arranged at the inner peripheral wall 130, within the connecting member 13. All or part of the input control member 11 is arranged outside the connecting member 13, as shown in FIGS. 1 to 5.

The input control member 11 and output control member 12 are integral with the support structure.

In particular, in the example embodiment shown in FIG. 1, the input control member 11 is formed by a lever attached to the support structure such that it can rotate, at a first end, said lever including, at a second end, an engagement profile 110.

The engagement profile 110 of the input control member 11 is bevel-shaped and is configured to directly engage with a driven engagement element 132 of the connecting member 13, so as to drive said connecting member 13 such that it rotates when said input control member 11 is acted upon.

In particular, as shown in FIG. 2 or FIG. 3, during the movement of the input control member 11, when the latter is acted upon by a user, the engagement profile 110 thereof applies pressure to the driven engagement element 132 of the connecting member 13, causing said connecting member 13 to pivot.

The driven engagement element 132 of the connecting member 13 is constituted by a bevel with a shape complementary to that of the bevel shape of the input control member 11.

Moreover, the output control member 12 further includes an engagement profile 120 configured to engage with the connecting member 13, and more particularly with a driving engagement element 133 thereof, such that the rotation of said connecting member 13 causes said output control member 12 to move.

In particular, as shown in FIGS. 1 to 3, the engagement profile 120 of the output control member 12 is bevelled.

In the example embodiment shown in FIGS. 1 to 3, the output control member 12 is formed by a lever attached to the support structure such that it can rotate, at a first end, said lever including, at a second end, the engagement profile 120. Advantageously, the output control member 12 is intended to act on the horological movement 100 via an internal flank opposite the engagement profile 120.

Moreover, in the example embodiment of the invention shown in FIGS. 1 to 3, the driving engagement element 133 is constituted by a catch, for example formed by a catch driven into the connecting member 13.

In other alternative embodiments of the invention not shown in the figures, the driven engagement element 132 and the driving engagement element 133 can be formed either by hollows made in the inner peripheral wall 130 and/or outer peripheral wall 131 of the connecting member 13, or by catches, bevels or any other protrusion extending from the connecting member 13. It goes without saying that, depending on the alternative embodiment of the driven engagement element 132 or driving engagement element 133 considered, the input control member 11 or respectively the output control member 12 are arranged in planes which are parallel or coincident with the plane in which the connecting member 13 extends.

Advantageously, the control device 10 can comprise a spring (not shown in the figures) connected to the connecting member 13 and biased to move it into a rest position in which said connecting member 13 is capable of engaging with the input control member 11. The term 'spring' is understood to mean any component that is capable of undergoing elastic deformation.

In particular, when the connecting member 13 is in the rest position, the input control member 11 is also in a rest position, i.e. it is not acted on by a user and is unmoving, and consequently, the output control member 12 is also in a rest position, as seen in FIG. 1.

In order to hold it in its rest position, the input control member 11 can advantageously be stressed by a spring 111, for example constituted by a resilient strip extending from the first end of said input control member 11 and arranged such that it abuts against the support structure.

In the example embodiment shown in FIGS. 1 to 3, the input control members 11 are configured such that, depending on which one is acted upon, the connecting member 13 is driven in a different direction of rotation and causes one or the other output control member 12 to move respectively, as shown in FIGS. 2 and 3 respectively.

The two input control members 11 are as described for the input control member 11 hereinabove and are preferably identical, as shown in FIGS. 1 to 3. Moreover, the input control members 11 are preferably arranged symmetrically to one another, along a diametrical plane of the connecting member 13.

Similarly, the two output control members 12 are as described for the output control member 12 hereinabove and are preferably identical, as shown in FIGS. 1 to 3. Moreover, the output control members 12 are preferably arranged symmetrically to one another, along a diametrical plane of the connecting member 13.

In the example embodiment of the invention shown in FIGS. 1 to 3, the connecting member 13 includes two driven engagement elements 132, each intended to engage with one of the input control members 11, and includes two driving engagement elements 133, each intended to engage with one of the output control members 12.

As shown in FIGS. 1 to 3 in an example embodiment of the invention, the connecting member 13 preferably further comprises a locking element 134 arranged to constitute a banking preventing one of the input control members 11 from making any movement when the other is acted upon.

In particular, the locking element 134 can advantageously be formed by a tooth extending between two bevelled radial flanks, each constituting a driven engagement element 132 intended to engage with one of the input control members 11. The tooth further comprises an inner flank opposite an outer flank connecting the radial flanks together. The outer flank has a curved shape, as does the inner flank, and is arranged so as to constitute a banking preventing one of the input control members 11 from making any movement when the other is acted upon, as shown in FIGS. 2 and 3.

As can be seen in FIGS. 1 to 3, with the bevelled radial flanks constituting the driven engagement elements 132, the outer flank extends over an angular sector that is smaller than that over which the inner flank extends.

In the example embodiment of the invention shown in FIGS. 4 and 5, the input control member 11 is formed by a stem, in particular a setting stem, arranged such that it can slide relative to the support structure. The input control member 11 is arranged such that it extends through the connecting member 13 and opens out from the inner peripheral wall 130 via an inner portion and from the outer peripheral wall 131 via an outer portion, as shown in FIGS. 4 and 5.

The input control member 11 is intended to be acted on by a pulling force exerted by a user along the longitudinal axis thereof, from its outer portion, and is configured to engage from its inner portion, via a transmission element, with a driven engagement element 132 of the connecting member 13.

More particularly, the input control member 11 is configured to engage, via an engagement profile 110, with a transmission yoke 14. The transmission yoke 14 is attached to the support structure such that it can rotate and engages with the connecting member 13, such that the sliding of said input control member 11 causes said transmission yoke 14 to rotate, which causes the connecting member 13 to rotate.

Preferably, the engagement profile 110 has the form of a radial groove with which a first end of the transmission yoke 14 engages in the form of a finger. Moreover, the driven engagement element 132 engages in a pivotal connection with a second end of the transmission yoke 14.

In the example embodiment shown in FIGS. 4 and 5, the output control member 12 further includes an engagement profile 120 configured to engage with a driving engagement element 133 of the connecting member 13, such that the rotation of said connecting member 13 causes said output control member 12 to move.

The output control member 12 is, in this example embodiment of the invention, formed by a lever that is attached, such that it can rotate, on the one hand, to the support structure and, on the other hand, to the connecting member 13.

In particular, as shown in FIGS. 4 and 5, the engagement profile 120 and the driving engagement element 133 can be formed indifferently by a pin and a bore respectively. The pivot link between the output control member 12 and the support structure can advantageously be produced in a similar manner.

In this example embodiment of the invention, the output control member 12 includes a bearing arm 121 intended to be arranged such that it bears against the balance of the horological movement 100 in order to perform the balance stop function, when the input control member 11 is acted upon, as seen in FIG. 5.

More generally, it should be noted that the implementations and embodiments considered above have been described by way of non-limiting examples, and that other alternatives are thus possible.

In particular, the input control member 11 and/or the output control member 12 are formed by yokes in the present description, but can be formed by any type of control, such as pull-out pieces, push buttons, a crown, or a wheel, etc.

Furthermore, the engagement profiles 110 and 120 can be formed by toothed portions meshing with the driven engagement element 132 and driving engagement element 133 respectively.

The invention claimed is:

1. A remote control device for a horological movement of a watch comprising:

an input control member intended to be acted on by a user and kinematically connected, with a connecting member, to an output control member intended to act on the horological movement of said watch, the connecting member being intended to be arranged such that the connecting member can rotate about the horological movement, and to cause the output control member to move during said rotation, wherein the input control member includes an engagement profile configured to engage with a driven engagement element of the connecting member, so as to drive said connecting member such that said connecting member rotates when said input control member is acted upon, the engagement profile and the driven engagement element being respectively shaped as complementary bevels, wherein the output control member comprises an engagement profile configured to engage with a driving engagement element of the connecting member, such that the rotation of said connecting member causes said output control member to move, and wherein the driven engagement element is disposed on a first portion of the connecting member and the driving engagement element is disposed on a second portion of the connecting member different than the first portion of the connecting member such that the driven engagement element and the driving engagement element both move with the connecting member when the connecting member rotates.

2. The control device according to claim 1, comprising a support structure with which the input control member and output control member are integral, said support structure forming an annular recess receiving the connecting member.

3. The control device according to claim 1, wherein the connecting member forms a ring.

4. The control device according to claim 1, wherein the input control member is formed by a lever extending between a first end by which said lever is attached to the support structure such that said lever can rotate, at a first end, said lever including, at a second end, the engagement profile.

5. The control device according to claim 1, comprising a support structure with which the input control member and output control member are integral, said support structure forming an annular recess receiving the connecting member, and wherein the input control member is arranged such that said input control member can slide relative to the support structure and is configured to engage, via the engagement profile, with a transmission element attached to the support structure such that said transmission element can rotate and engaging with the connecting member, such that the sliding of said input control member causes the connecting member to rotate.

6. The control device according to claim 2, wherein the output control member is formed by a lever attached to the support structure such that said lever can rotate, at a first end, said lever including a bevel at a second end, constituting the engagement profile, said output control member being intended to act on the horological movement via an internal flank opposite the engagement profile.

7. The control device according to claim 2, wherein the output control member is connected by a pivot link to the connecting member, and wherein said output control member is further connected to the support structure, said output control member comprising a bearing arm intended to be arranged such that said bearing arm bears against a balance of the horological movement in order to perform a balance stop function when the input control member is acted upon.

8. The control device according to claim 2, wherein the driving engagement element is constituted by a catch.

9. The control device according to claim 1, comprising a spring connected to the connecting member and biased to move said connecting member into a rest position wherein said connecting member is capable of engaging with the input control member.

10. The control device according to claim 1, comprising a second input control member and a second output control member kinematically connected to one another via the connecting member and respectively configured to engage with another driven engagement member and with another driving engagement member, the input control members being configured such that, depending on which one is acted upon, the connecting member is driven in a different direction of rotation and causes one or the other output control member respectively to move.

11. The control device according to claim 10, wherein the connecting member comprises a locking element arranged to constitute a banking preventing one of the input control members from making any movement when the other is acted upon.

12. The control device according to claim 10, wherein the connecting member comprises a locking element arranged to constitute a banking preventing one of the input control members from making any movement when the other is acted upon and wherein the locking element is formed by a tooth extending between two bevelled radial flanks each constituting one of the driven engagement elements, the tooth further comprising an outer flank connecting the radial flanks together and being arranged so as to constitute the banking preventing one of the input control members from making any movement, when the other is acted upon.

13. A watch comprising:

a horological movement; and the remote control device according to claim 1.

* * * * *